(12) United States Patent
Zhang

(10) Patent No.: US 12,024,231 B2
(45) Date of Patent: Jul. 2, 2024

(54) CROSS-MEMBER STRUCTURE FOR A VEHICLE

(71) Applicant: Shanghai Yanfeng Jinqiao Automotive Trim Systems Co. Ltd., Novi, MI (US)

(72) Inventor: Junwei Zhang, Shanghai (CN)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 75 days.

(21) Appl. No.: 17/567,830

(22) Filed: Jan. 3, 2022

(65) Prior Publication Data

US 2022/0119042 A1 Apr. 21, 2022

Related U.S. Application Data

(63) Continuation-in-part of application No. PCT/CN2020/101654, filed on Jul. 13, 2020.

(30) Foreign Application Priority Data

Jul. 17, 2019 (CN) .......................... 201910643158.3

(51) Int. Cl.
  *B62D 25/14* (2006.01)
  *B60K 37/00* (2024.01)
(52) U.S. Cl.
  CPC ............ *B62D 25/145* (2013.01); *B60K 37/00* (2013.01)
(58) Field of Classification Search
  CPC .... B62D 25/145; B62D 29/004; B62D 27/02; B62D 25/147; B60K 37/00
  (Continued)

(56) References Cited

U.S. PATENT DOCUMENTS 5,088,571 A 2/1992 Burry et al.
5,269,574 A 12/1993 Bhutani et al.
(Continued)

FOREIGN PATENT DOCUMENTS

CN 203199051 U 9/2013
CN 203473016 U 3/2014
(Continued)

OTHER PUBLICATIONS

International Search Report and Written Opinion received for PCT Application Serial No. PCT/CN2020/101654 dated Oct. 15, 2020, 7 pages.
(Continued)

*Primary Examiner* — Amy R Weisberg
*Assistant Examiner* — Veronica M Schull
(74) *Attorney, Agent, or Firm* — Amin, Turocy & Watson, LLP

(57) ABSTRACT

A cross-member structure/assembly for a vehicle providing an instrument panel is disclosed. The assembly may comprise a composite structure/assembly comprising a plastic beam structure and a metal structural support section to reinforce the plastic beam structure. The assembly may comprise a metal structural member and/or metal bracket member. The assembly may provide structural reinforcement and integrate vehicle systems/subsystems with the instrument panel. The assembly may comprise a set of sections/segments such as an arrangement of beam/structure sections, mounting sections, and structural elements including members, webs, flanges, stiffeners, reinforcement, plates, walls, surfaces, etc. The assembly may comprise an intermediate structural support section configured to support the beam structure. The metal structural support section may be assembled with the plastic beam structure; the metal structural member may be formed with the plastic beam (Continued)

structure (e.g. insert molding, over-molding, etc.). The metal may comprise an alloy such as steel, aluminum, magnesium, etc.

20 Claims, 8 Drawing Sheets

(58) Field of Classification Search
USPC .......... 296/193.01, 193.02, 70, 37.12, 24.34
See application file for complete search history.

(56) References Cited

U.S. PATENT DOCUMENTS

| | | | |
|---|---|---|---|
| 5,934,744 A | 8/1999 | Jergens et al. | |
| 6,286,879 B1 | 9/2001 | Haque et al. | |
| 6,676,202 B2 * | 1/2004 | Brancheriau | B62D 25/145 |
| | | | 296/70 |
| 6,761,395 B2 * | 7/2004 | Charbonnel | B62D 29/001 |
| | | | 296/70 |
| 6,988,764 B2 | 1/2006 | Matsutani | |
| 7,264,295 B2 * | 9/2007 | Vander Sluis | B62D 25/145 |
| | | | 296/72 |
| 7,370,719 B2 | 5/2008 | Sakamoto | |
| 8,801,087 B2 | 8/2014 | Kim et al. | |
| 9,302,714 B2 * | 4/2016 | Kropla | B62D 41/00 |
| 9,446,540 B2 | 9/2016 | Marchetti et al. | |
| 9,493,192 B2 | 11/2016 | Baudard et al. | |
| 9,580,107 B1 | 2/2017 | Ranga | |
| 2006/0191704 A1 | 8/2006 | Riester et al. | |
| 2008/0065358 A1 | 3/2008 | Mundinger et al. | |
| 2008/0167415 A1 | 7/2008 | Stoeppelmann et al. | |
| 2009/0008956 A1 * | 1/2009 | Scheib | B62D 29/001 |
| | | | 296/70 |
| 2011/0272961 A1 * | 11/2011 | Scheib | B62D 29/005 |
| | | | 296/72 |
| 2012/0032044 A1 * | 2/2012 | Ruiz Rincon | B62D 25/145 |
| | | | 248/205.3 |
| 2014/0217780 A1 * | 8/2014 | Vican | B62D 25/147 |
| | | | 296/72 |
| 2015/0056428 A1 * | 2/2015 | Birka | B62D 29/008 |
| | | | 428/209 |
| 2015/0284035 A1 | 10/2015 | Reese | |
| 2015/0321398 A1 | 11/2015 | Bharathan et al. | |
| 2019/0031247 A1 * | 1/2019 | Baudart | B62D 25/145 |
| 2021/0053625 A1 * | 2/2021 | Richardson | B62D 27/02 |

FOREIGN PATENT DOCUMENTS

| | | |
|---|---|---|
| CN | 103930339 A | 7/2014 |
| CN | 102604369 B | 3/2015 |
| CN | 104386136 A | 3/2015 |
| CN | 105416405 A | 3/2016 |
| CN | 205256458 U | 5/2016 |
| CN | 205292812 U | 6/2016 |
| CN | 106080799 A | 11/2016 |
| CN | 205706896 U | 11/2016 |
| CN | 106627786 A | 5/2017 |
| CN | 106945729 A | 7/2017 |
| CN | 107160637 A | 9/2017 |
| CN | 107215397 A | 9/2017 |
| CN | 107399222 A | 11/2017 |
| CN | 107472373 A | 12/2017 |
| CN | 105857406 B | 4/2018 |
| CN | 207595065 U | 7/2018 |
| CN | 207889833 U | 9/2018 |
| CN | 108639160 A | 10/2018 |
| CN | 108791514 A | 11/2018 |
| CN | 208715299 U | 4/2019 |
| CN | 210502891 U | 5/2020 |
| DE | 10 2010 014 538 A1 | 10/2011 |
| DE | 10 2016 005 450 A1 | 12/2016 |
| DE | 10 2016 207 765 A1 | 11/2017 |
| DE | 10 2017 004 843 A1 | 11/2017 |
| EP | 1842714 A1 | 10/2007 |
| EP | 1762469 B1 | 10/2009 |
| EP | 2 780 216 B1 | 2/2016 |
| WO | 2013072021 A1 | 5/2013 |
| WO | 2016/051331 A1 | 4/2016 |
| WO | 2018/055515 A1 | 3/2018 |
| WO | 2020/011206 A1 | 1/2020 |

OTHER PUBLICATIONS

International Search Report and Written Opinion from the International Searching Authority for International Patent Application No. PCT/CN2019/095455 dated Oct. 21, 2019 (English Translation) (10 Pages).
Supplementary Search for European Application No. 20840049.9, 6 pages.
First Office Action received for Chinese Patent Application Serial No. 201910643158.3 dated Mar. 26, 2024, 11 pages (Including English Translation).

* cited by examiner

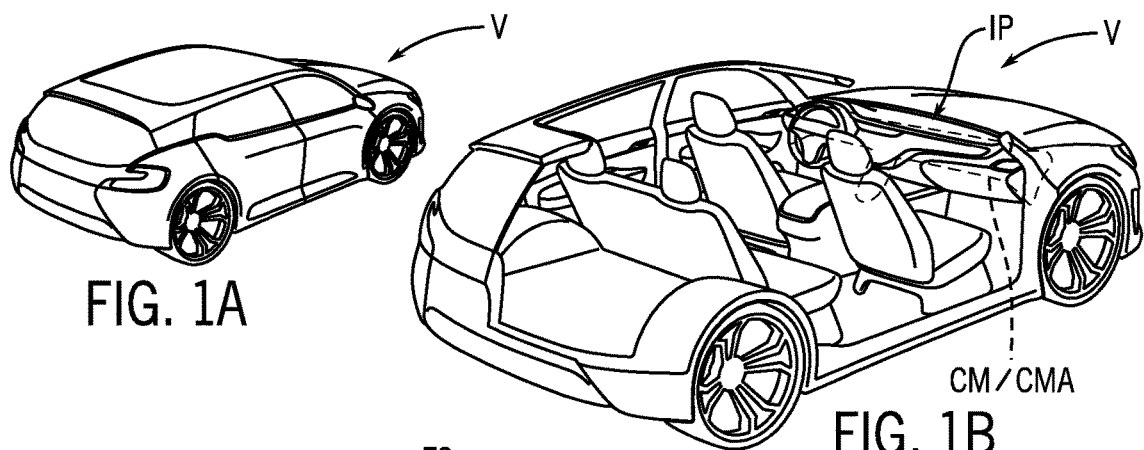
FIG. 1A
FIG. 1B
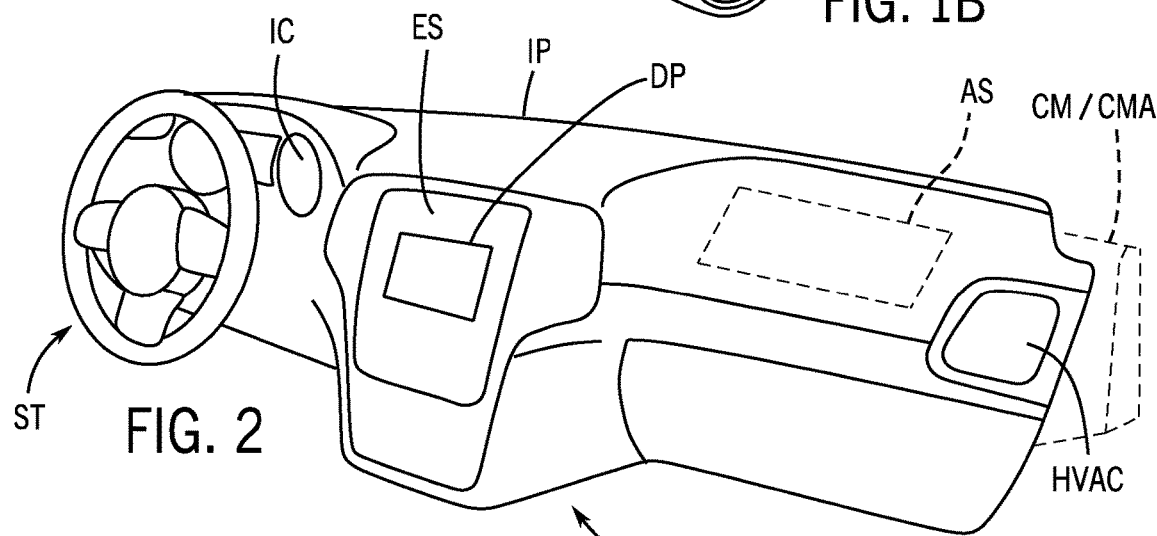
FIG. 2
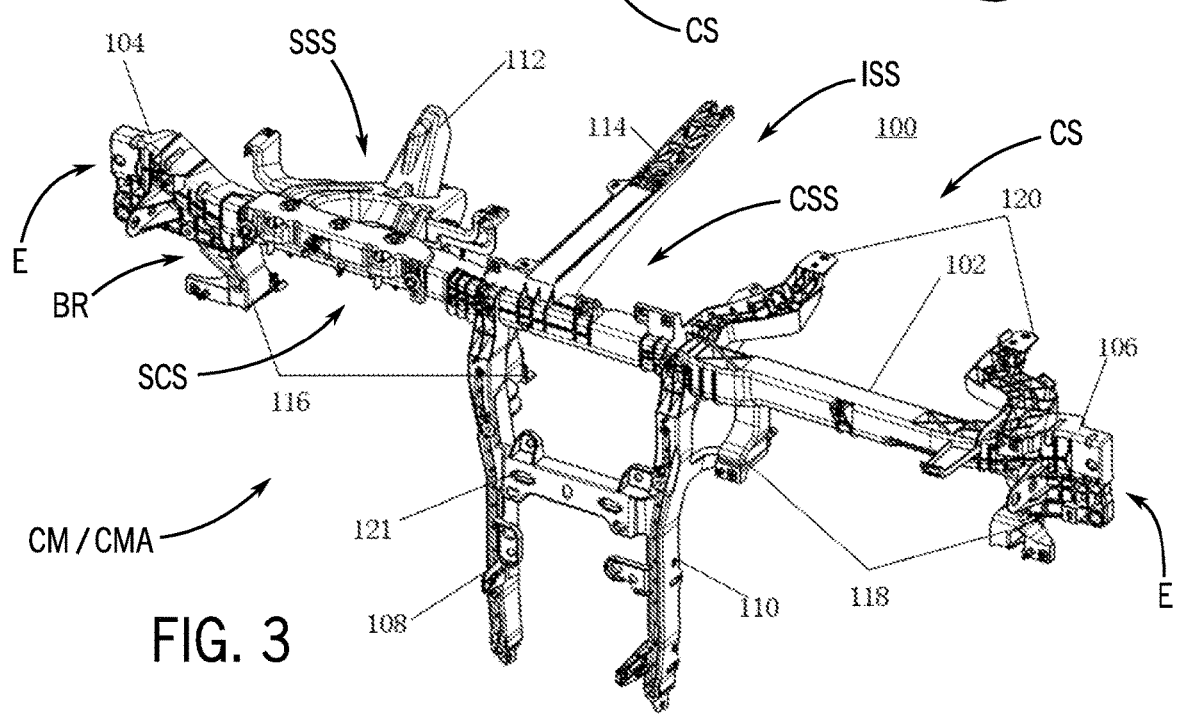
FIG. 3

CROSS-MEMBER STRUCTURE FOR A VEHICLE

CROSS-REFERENCE TO RELATED APPLICATIONS

The present application is a schematic continuation-in-part of PCT/International Patent Application No. PCT/CN2020/101654 filed Jul. 13, 2020, which claims the benefit of Chinese Patent Application No. 201910643158.3, filed Jul. 17, 2019.

The present application claims priority to and incorporates by reference in full the following patent applications: (a) Chinese Patent Application No. 201910643158.3, filed Jul. 17, 2019; (b) PCT/International Patent Application No. PCT/CN2020/101654, filed Jul. 13, 2020.

FIELD

The present invention relates to a cross-member structure for a vehicle.

The present invention also relates to a cross-member assembly configured for installation in a vehicle.

BACKGROUND

It is known to provide a cross-member structure for a vehicle.

It would be advantageous to provide an improved cross-member structure for a vehicle.

It would also be advantageous to provide a cross-member structure as a cross-member assembly configured for installation in a vehicle providing vehicle systems including an instrument panel.

It would also be advantageous to provide a cross-member structure as a cross-member assembly comprising a composite structure with a plastic beam structure and a metal structural support section.

SUMMARY

The present invention relates to a cross-member assembly configured for installation in a vehicle providing vehicle systems including an instrument panel comprising a composite structure comprising a beam structure comprising a plastic material and a structural support section comprising a metal material and a set of mounting structures at each end of the beam structure configured to mount the composite beam structure to the vehicle; the structural support section may be configured to reinforce the beam structure of the composite beam structure. The assembly may comprise a metal structural member configured to reinforce the beam structure of the composite structure. The metal structural member may comprise a metal beam structure. The assembly may comprise a metal structural member and a metal bracket member configured to reinforce the beam structure of the composite structure. The structural support section may comprise a metal structure. The beam structure may comprise at least one of (a) an integrally-formed plastic structure or (b) an injection-molded plastic structure or (c) an injection-molded plastic structure with insert or (d) and over-molded plastic structure with insert. The composite beam structure may provide a steering column structure section and an intermediate structure section; the structural support section with the metal structural member may be configured to reinforce the beam structure of the composite beam structure at the steering column structure section. The composite beam structure may provide a plastic steering column structure section and a plastic intermediate structure section; the metal structural member may be over-molded in the composite beam structure with the plastic steering column structure section and the plastic intermediate structure section. The assembly may comprise an intermediate structural support section configured to support the intermediate structure section of the beam structure of the composite structure. The beam structure may comprise a plastic beam structure; the metal structural support section may be assembled with the plastic beam structure of the composite structure. The beam structure may comprise a plastic beam structure; the metal structural member may be formed with the plastic beam structure of the composite structure. The metal structural member may be configured to provide reinforcement for installation of a display panel on the composite structure for the instrument panel. The structural support section may comprise an assembly. The metal material may comprise at least one of (a) steel; (b) an aluminum alloy; (c) a magnesium alloy; (d) a die-cast material; (e) an injection-molded metal.

The present invention relates to an instrument panel cross-member assembly for a vehicle providing a floor panel comprising a plastic cross-member body comprising a first end and a second end and a metal structure configured to reinforce the plastic cross-member body; the metal structure may comprise a first structural member and a second structural member; a first bracket may be adjacent the first end of the plastic cross-member body; a second bracket may be configured to connect with the floor panel of the vehicle; the plastic cross-member body may comprise a section configured to extend along the longitudinal direction between the first bracket and the second bracket. The metal structure may be configured to support the central console of the vehicle. The first structural member may comprise a metal bracket; the second structural member may comprise a metal bracket. The first structural member and the second structural member may be integrally formed with the plastic cross-member body by an insert injection molding process. The first structural member and/or the second structural member comprise (a) a U-shaped structure and/or (b) an H-shaped structure. The first structural member and/or the second structural member may be provided with a reinforcing rib. The plastic cross-member body may comprise at least one of (a) a plastic material or (b) a resin material or (c) a glass fiber reinforced polypropylene or (d) a carbon fiber material or (e) a composite material. The assembly may comprise a third structural member configured to mount a steering column and to connect to the floor panel of the vehicle; the third structural member may comprise at least one of (a) a metal structure connected to the plastic cross-member body and/or (b) a plastic section integrally-formed with the plastic cross-member body.

FIGURES

FIGS. 1A and 1B are schematic perspective views of a vehicle according to an exemplary embodiment.

FIG. 2 is a schematic perspective view of an instrument panel with a cross-member structure/assembly according to an exemplary embodiment.

FIG. 3 is a schematic perspective view of a cross-member structure/assembly for an instrument panel according to an exemplary embodiment.

FIG. 3A is a schematic perspective partial view of a cross-member structure/assembly for an instrument panel of FIG. 3 according to an exemplary embodiment.

FIG. 4A is a schematic partial perspective exploded view of a cross-member structure/assembly for an instrument panel of FIG. 4 according to an exemplary embodiment.

DESCRIPTION

Referring to FIGS. 1A-1B and 2, a vehicle V is shown providing a vehicle interior with a cross-member structure/assembly CM/CMA for an instrument panel IP. As indicated schematically in FIGS. 1B, 2 and 3, the cross member structure/cross-member assembly CM/CMA may be configured for installation between/across the sides of the vehicle (e.g. for structural reinforcement); as indicated schematically, the instrument panel IP may be installed over the cross-member structure/cross-member assembly CM/CMA. See FIGS. 1B and 2.

As shown schematically according to an exemplary embodiment in FIGS. 1B, 2 and 3, the cross-member structure/cross-member assembly CM/CMA may comprise a composite structure CS with a beam structure BR (e.g. in a generally horizontal arrangement when installed in the vehicle) and a support section SSS (e.g. in or within the beam structure).

As indicated in FIGS. 1B and 2, the vehicle may comprise vehicle systems/subsystems that are integrated within the vehicle interior including a steering system ST (e.g. with steering wheel/column assembly) and instrumentation/control system IC (e.g. providing instrumentation visible at/adjacent the steering system) and an airbag system (with airbag chute/module configured to deploy an airbag into the vehicle interior) and heating/ventilation and air conditioning system HVAC (e.g. with vents/ducts and outlets into the vehicle interior) and a user interface system ES (e.g. with display/panel, control elements, communications, audio/video, entertainment system, networking/connectivity, device connectivity) and a center section (e.g. with storage/compartments, system components, connectivity, center stack, console, etc.). See also FIGS. 3, 4, 5, 8, 10 and 14.

Figure 4:
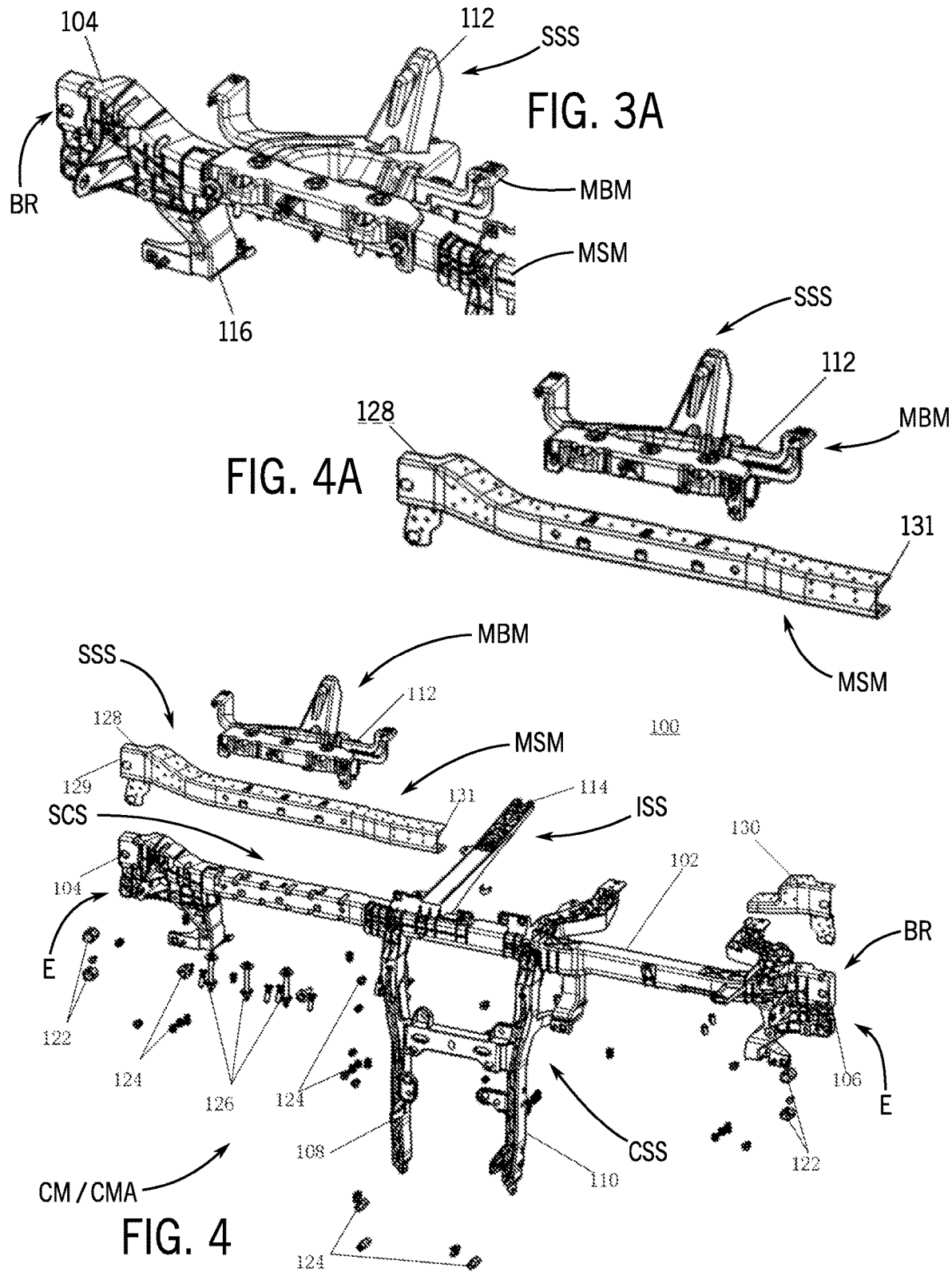
FIG. 4 is a schematic perspective exploded view of a cross-member structure/assembly for an instrument panel according to an exemplary embodiment.
Figure 5:
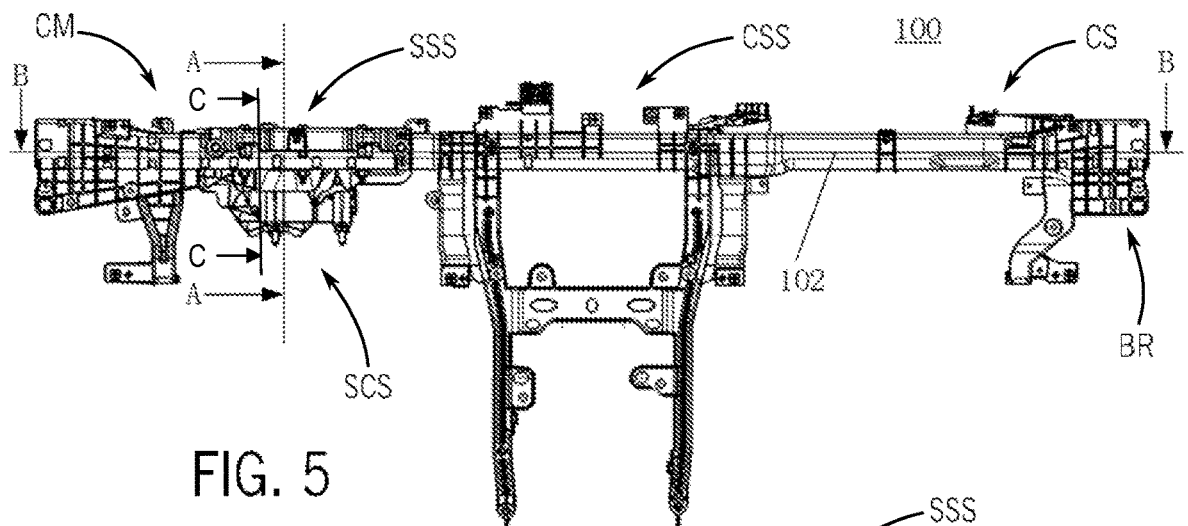
FIG. 5 is a schematic front view of a cross-member structure/assembly for an instrument panel according to an exemplary embodiment.
Figure 5A:
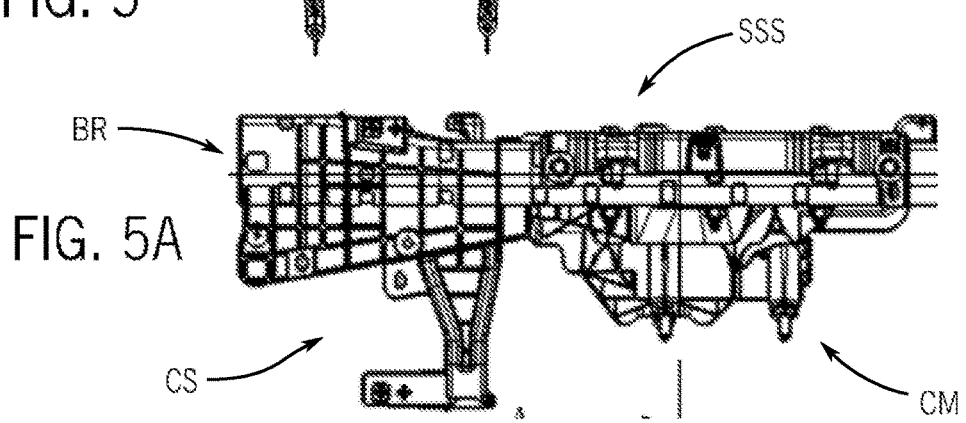
FIG. 5A is a schematic partial front view of a cross-member structure/assembly for an instrument panel of FIG. 5 according to an exemplary embodiment.

As indicated schematically in FIGS. 1B, 2 and 3, the cross-member structure/cross-member assembly CM/CMA may comprise a composite structure CS configured to provide a set of sections/segments configured for integration within the structure of the vehicle and with the vehicle systems/sub-systems. See also FIGS. 8, 10 and 14. As shown in FIGS. 2, 3 and 4, the beam structure BR (e.g. horizontal structure) of the cross-member structure/cross-member assembly CM/CMA may be configured to provide a set of mounting structures E (e.g. configured to be mounted to the vehicle structure) with a beam structure section and a steering column structure section SCS (e.g. for the steering system/column assembly) and an intermediate structure section CSS (e.g. intermediate/center beam structure section) and an airbag system interface structure section; the support (e.g. vertical structure) of the cross-member structure/cross-member assembly CM/CMA may be configured to provide a center system integration section CSS to support a center stack/entertainment system integration section such as may provide a user interface, display, panel, etc. See also FIGS. 8, 10 and 14.

As indicated schematically in FIGS. 2 and 3, the cross-member structure CM as a composite structure CS with beam structure BR and support SSS may be engineered and configured to provide structural reinforcement for the vehicle and to integrate each of the vehicle systems/subsystems with the instrument panel IP. See also FIGS. 8, 10 and 14.

As shown schematically according to an exemplary embodiment in FIGS. 2 and 3, the structure of the cross-member structure CM may be engineered and configured to provide a mounting structures E to the vehicle structure and for the instrument panel IP; as indicated schematically, the beam structure BR and the support SSS each may comprise a multi-section structure/assembly engineered and configured for performance requirements/specifications and for vehicle/vehicle system integration (e.g. with sections/structures provided and configured in shape, form, construction, etc.). See generally FIGS. 4, 5, 8, 10, 12A-12B, 14. According to an exemplary embodiment as indicated schematically, each section of the multi-section structure of the cross-member structure may be engineered designed and configured/modified so that the beam structure C and support S as designed/installed are suited for a particular vehicle/vehicle application (e.g. with an arrangement of beam/structure sections, mounting sections, and structural elements including members, webs, flanges, stiffeners, reinforcements, plates, walls, panels, surfaces, wings, ribs, flaps, projections, spacers, portions, sections, slots, etc.). See generally FIGS. 3, 4, 5-5A, 6, 7A-7B, 8-8A, 9, 10-10A, 11, 12A-12B, 13A-13B, 14, 15 and 16.

As shown schematically in FIGS. 2, 3-3A and 4-4A, the multi-section structure configuration of the beam structure C may comprise the mounting structures E and the beam structure sections BR with a steering column structure section SCS and an intermediate/center structure section CSS; the structure may comprise an airbag system interface structure section. As indicated schematically, each mounting structure E may provide a mounting flange/section configured for attachment to the structure of the vehicle. See e.g. FIGS. 3 and 4.

As shown schematically according to an exemplary embodiment in FIGS. 2, 3 and 4, the multi-section configuration of the cross-member structure CM with composite structure CS with beam structure BR and support SSS may be provided in formed or assembled construction (e.g. an integrally-formed molded construction with insert, an assembled set of components/structures, etc.). According to an exemplary embodiment, the cross-member structure CM may comprise an integrally formed/molded form for the beam structure BR and with support SSS providing lightweight high-strength formed and/or assembled construction (e.g. with composite materials, plastic materials, metals, alloys, etc. selected to provide suitable material properties of strength/performance). As shown schematically according to an exemplary embodiment, the multi-section configuration of the cross-member structure for a vehicle application may comprise a design/engineered arrangement of beam/structure sections, mounting sections, and structural elements (including members, webs, flanges, stiffeners, reinforcements, plates, walls, surfaces, wings, etc.) suited for the vehicle application/system integration (including shape, size, form, fit, materials, material properties, mass/weight, strength, rigidity, elasticity/flexibility, etc.) and the performance requirements/specifications. See generally FIGS. 3, 4, 5-5A, 6, 7A-7B, 8-8A, 9, 10-10A, 11, 12A-12B, 13A-13B, 14, 15 and 16.

As shown schematically in FIGS. 3-3A, 4-4A, 8, 10 and 14, the cross member structure may comprise a cross-member assembly CMA with a beam structure BR and a support SSS providing a base in an assembly comprising a support member.

As indicated schematically according to an exemplary embodiment in FIGS. 3-3A, 4-4A, 8-8A, 10-10A and 14, a cross-member assembly CM configured for installation in a vehicle providing vehicle systems including an instrument panel IP is provided. The cross-member assembly CM may comprise a composite structure CS comprising a beam structure BR comprising a plastic material and a structural support section SSS comprising a metal material and a set of mounting structures E at each end of the beam structure BR configured to mount the composite beam structure CS to the vehicle; the structural support section SSS may be configured to reinforce the beam structure BR of the composite beam structure CS. The assembly may comprise a metal structural member MSM configured to reinforce the beam structure BR of the composite structure CS. The metal structural member MSM may comprise a metal beam structure. The assembly may comprise a metal structural member MSM and a metal bracket member MBM configured to reinforce the beam structure BR of the composite structure CS. The structural support section SSS may comprise a metal structure. The beam structure BR may comprise at least one of an integrally-formed plastic structure or an injection-molded plastic structure or an injection-molded plastic structure with insert or an over-molded plastic structure with insert. The composite beam structure CS may provide a steering column structure section SCS and an intermediate structure section CSS; the structural support section SSS with the metal structural member MSM may be configured to reinforce the beam structure BR of the composite beam structure CS at the steering column structure section SCS. The composite beam structure CS may provide a plastic steering column structure section SCS and a plastic intermediate structure section CSS; the metal structural member MSM may be overmolded in the composite beam structure CS with the plastic steering column structure section SCS and the plastic intermediate structure section CSS. The assembly may comprise an intermediate structural support section ISS configured to support the intermediate structure section CSS of the beam structure BR of the composite structure CS. The beam structure BR may comprise a plastic beam structure; the metal structural support section SSS may be assembled with the plastic beam structure BR of the composite structure CS. The beam structure BR may comprise a plastic beam structure; the metal structural member MSM may be formed with the plastic beam structure BR of the composite structure CS. The metal structural member MSM may be configured to provide reinforcement for installation of a display panel DP on the composite structure for the instrument panel IP. The structural support section SSS may comprise an assembly. The metal material of the metal structures/components of the composite structure may comprise at least one of steel or an aluminum alloy or a magnesium alloy or a die-cast material or an injection-molded metal.

As indicated schematically in FIGS. 1B, 2 and 3, implementation of the functionality of the cross-member structure may be provided with the cross-member assembly/structure CMA/CM. As shown schematically, the multi-section cross-member structure may be engineered/designed and constructed/assembled with an arrangement of structural elements and sections configured to provide strength and rigidity as well as reduced weight and a fit/compact form for integration with the vehicle (including the vehicle structure and systems/subsystems). See generally FIGS. 4-4A, 5-5A, 6, 7A-7B, 8-8A, 9, 10-10A, 11, 12A-12B, 13A-13B, 14, 15 and 16.

As indicated schematically in FIGS. 1B, 2 and 3, the cross-member structure/assembly CM may be configured to support and integrate with the instrument panel IP of the vehicle (and any associated structures/components for the vehicle such as a center stack/user interface, floor console, storage compartments, etc.). See also FIGS. 8, 10 and 14.

As indicated schematically in FIGS. 1B and 2, the cross-member structure may be configured for integration with vehicle systems such as at least one of: a steering system (shown as steering wheel/column ST); an airbag system (shown as system AS with instrument panel IP); an user interface system (shown as infotainment/entertainment system ES with display panel DP in center stack); a ventilation system (shown as providing HVAC outlet); an instrumentation system (shown as instrumentation IC); center section/system (e.g. center stack with storage, connectivity, console, etc.); storage system (e.g. compartment for storage in instrument panel, center storage compartment, holders, etc.). See also FIGS. 3, 4, 8, 10 and 14.

As shown schematically in FIGS. 2, 3-3A, 4-4A, 5-5A, 8-8A, 10-10A and 14, the improved cross member structure for a vehicle may comprise a cross-member structure comprising multiple sections configured (e.g. designed/engineered) to provide structural properties/performance for the vehicle application; the improved cross member structure for a vehicle may be designed and constructed for use with materials that provide relatively lightweight and relatively high strength and for efficient manufacture (e.g. as an integrally-formed component, formed from composite material, formed from plastic material, formed as an injection molded component, etc.). As indicated schematically, the improved cross-member structure may be configured for efficient manufacture and installation in a vehicle including integration with an instrument panel and one or more other vehicle systems. See generally FIGS. 1B and 2.

Exemplary Embodiments—A

As shown schematically according to an exemplary embodiment in FIGS. 2, 3, 4, 8, 10 and 14, a cross-member assembly CM configured for installation in a vehicle providing vehicle systems including an instrument panel IP is provided. The cross-member assembly CM may comprise a composite structure CS comprising a beam structure BR comprising a plastic material and a structural support section SSS comprising a metal material and a set of mounting structures E at each end of the beam structure BR configured to mount the composite beam structure CS to the vehicle; the structural support section SSS may be configured to reinforce the beam structure BR of the composite beam structure CS. The assembly may comprise a metal structural member MSM configured to reinforce the beam structure BR of the composite structure CS. The metal structural member MSM may comprise a metal beam structure. The assembly may comprise a metal structural member MSM and a metal bracket member MBM configured to reinforce the beam structure BR of the composite structure CS. The structural support section SSS may comprise a metal structure. The beam structure BR may comprise at least one of an integrally-formed plastic structure or an injection-molded plastic structure or an injection-molded plastic structure with insert or an over-molded plastic structure with insert. The composite beam structure CS may provide a steering column structure section SCS and an intermediate structure section CSS; the structural support section SSS with the metal structural member MSM may be configured to reinforce the beam structure BR of the composite beam structure CS at the steering column structure section SCS. The composite beam structure CS may provide a plastic steering column structure section SCS and a plastic intermediate structure section CSS; the metal structural member MSM may be overmolded in the composite beam structure CS with the plastic steering column structure section SCS and the plastic intermediate structure section CSS. The assembly may comprise an intermediate structural support section ISS configured to support the intermediate structure section CSS of the beam structure BR of the composite structure CS. The beam structure BR may comprise a plastic beam structure; the metal structural support section SSS may be assembled with the plastic beam structure BR of the composite structure CS. The beam structure BR may comprise a plastic beam structure; the metal structural member MSM may be formed with the plastic beam structure BR of the composite structure CS. The metal structural member MSM may be configured to provide reinforcement for installation of a display panel DP on the composite structure for the instrument panel IP. The structural support section SSS may comprise an assembly. The metal material may comprise at least one of steel; an aluminum alloy; a magnesium alloy; a die-cast material; an injection-molded metal.

As shown schematically according to an exemplary embodiment in FIGS. 2, 3, 4, 8, 10 and 14, an instrument panel cross-member assembly CM for a vehicle providing a floor panel is provided. The instrument panel cross-member assembly CM may comprise a plastic cross-member body comprising a first end and a second end and a metal structure configured to reinforce the plastic cross-member body; the metal structure may comprise a first structural member and a second structural member; a first bracket may be adjacent the first end of the plastic cross-member body; a second bracket may be configured to connect with the floor panel of the vehicle; the plastic cross-member body may comprise a section configured to extend along the longitudinal direction between the first bracket and the second bracket. The metal structure may be configured to support the central console of the vehicle. The first structural member may comprise a metal bracket; the second structural member may comprise a metal bracket. The first structural member and the second structural member may be integrally formed with the plastic cross-member body by an insert injection molding process. The first structural member and/or the second structural member comprise a U-shaped structure and/or an H-shaped structure. The first structural member and/or the second structural member may be provided with a reinforcing rib. The plastic cross-member body may comprise at least one of a plastic material or a resin material or a glass fiber reinforced polypropylene or a carbon fiber material or a composite material. The assembly may comprise a third structural member configured to mount a steering column and to connect to the floor panel of the vehicle; the third structural member may comprise at least one of a metal structure connected to the plastic cross-member body and/or a plastic section integrally-formed with the plastic cross-member body.

As shown schematically according to an exemplary embodiment in FIGS. 2, 3, 4, 8, 10 and 14, the cross-member structure may comprise a beam structure (e.g. generally horizontal cross-member) provided by a composite structure/assembly. The composite structure/assembly may comprise a plastic beam structure and a metal support structure. The cross-member structure may provide support for an instrument panel and/or to integrate with vehicle systems. The cross-member structure may provide a set of sections/segments such as an arrangement of beam/structure sections, mounting sections, and structural elements including members, webs, flanges, stiffeners, reinforcement, plates, walls, surfaces, etc. The cross-member structure may provide structural reinforcement for the vehicle and may integrate vehicle systems/subsystems with the instrument panel.

As shown schematically according to an exemplary embodiment in FIGS. 2, 3, 4, 8, 10 and 14, the assembly may comprise a composite structure/assembly comprising a plastic beam structure and a metal structural support section to reinforce the plastic beam structure. The assembly may comprise a metal structural member and/or metal bracket member. The assembly may provide structural reinforcement and integrate vehicle systems/subsystems with the instrument panel. The assembly may comprise a set of sections/segments such as an arrangement of beam/structure sections, mounting sections, and structural elements including members, webs, flanges, stiffeners, reinforcement, plates, walls, surfaces, etc. The assembly may comprise an intermediate structural support section configured to support the beam structure. The metal structural support section may be assembled with the plastic beam structure; the metal structural member may be formed with the plastic beam structure (e.g. by molding). The metal may comprise an alloy such as steel, aluminum, magnesium, etc.

Exemplary Embodiments—B

As shown schematically in FIGS. 2, 3-3A, 4-4A and 5-5A, a composite structure shown as instrument panel cross beam 100 may comprise a cross beam body 102 and brackets provided for mounting and/or connection and/or reinforcement. See also FIGS. 8, 10 and 14.

As indicated schematically according to an exemplary embodiment in FIGS. 3, 4, 5 and 6, the cross beam body 102 may be made of plastic and may comprise a first end 104 and a second end 106. The first end 104 and the second end 106 of the cross beam body 102 may be adapted to connect with left and right sidewall metal sheets of the vehicle, respectively. The bracket for mounting and/or connection may comprise a first bracket 108 and a second bracket 110. The first bracket 108 and the second bracket 110 may be provided in the middle of the cross beam body 102 and adapted to support the central console of the vehicle, with the first bracket 108 being closer to the first end 104 of the cross beam 102 than the second bracket 110. The first bracket 108 may be adapted to connect with a floor metal sheet of the vehicle. The second bracket 110 may be connected with the floor metal sheet of the vehicle, and the second bracket 110 may not be connected with the floor metal sheet of the vehicle but may be used to reinforce the instrument panel cross beam 100. The first bracket 108 and the second bracket 110 may divide the instrument panel cross beam 100 into three sections: a driver side section to the left of the first bracket 108, a central section between the first bracket 108 and the second bracket 110, and a passenger side section to the right of the second bracket 110. According to an exemplary embodiment, the bracket for mounting and/or connection may comprise a third bracket 112 adapted to mount a steering column and adapted to be connected with a front sidewall metal sheet of the vehicle; a fourth bracket 114 adapted to connect to a front sidewall metal sheet of the vehicle and located in the middle of the cross beam body 102 located between the first bracket 108 and a center of the cross beam body 102 in the longitudinal direction and close to the first bracket 108; a fifth bracket 116 for mounting a driver side knee-airbag; a sixth bracket 118 for mounting a passenger side knee-airbag; a seventh bracket 120 for mounting a passenger airbag; and an eighth bracket 121 for mounting an air conditioner and an instrument panel. (According to an exemplary embodiment, the corresponding brackets may be provided according to actual mounting and connection requirements.)

According to an exemplary embodiment shown schematically in FIG. 4, the instrument panel cross beam 100 may comprise elements for mounting or assembly, such as sleeves 122, nuts 124, and bolts 126.

According to an exemplary embodiment as shown schematically in FIGS. 4, 5, 6 and 7A-7B, the third bracket 112 may be made of magnesium alloy and may be connected to the cross beam body 102 by bolts 126; bracket 108, bracket 110, bracket 114, bracket 116, bracket 118, bracket 120 and bracket 121 may be made of plastic and/or integrally formed with the cross beam body 102 by an injection molding process. According to an exemplary embodiment, one or more of the brackets for mounting and/or connection may be separate components and connected to the cross beam body by fasteners, or the brackets for mounting and/or connection may each be made of plastic and integrally formed with the cross beam body by an injection molding process.

Figure 8:
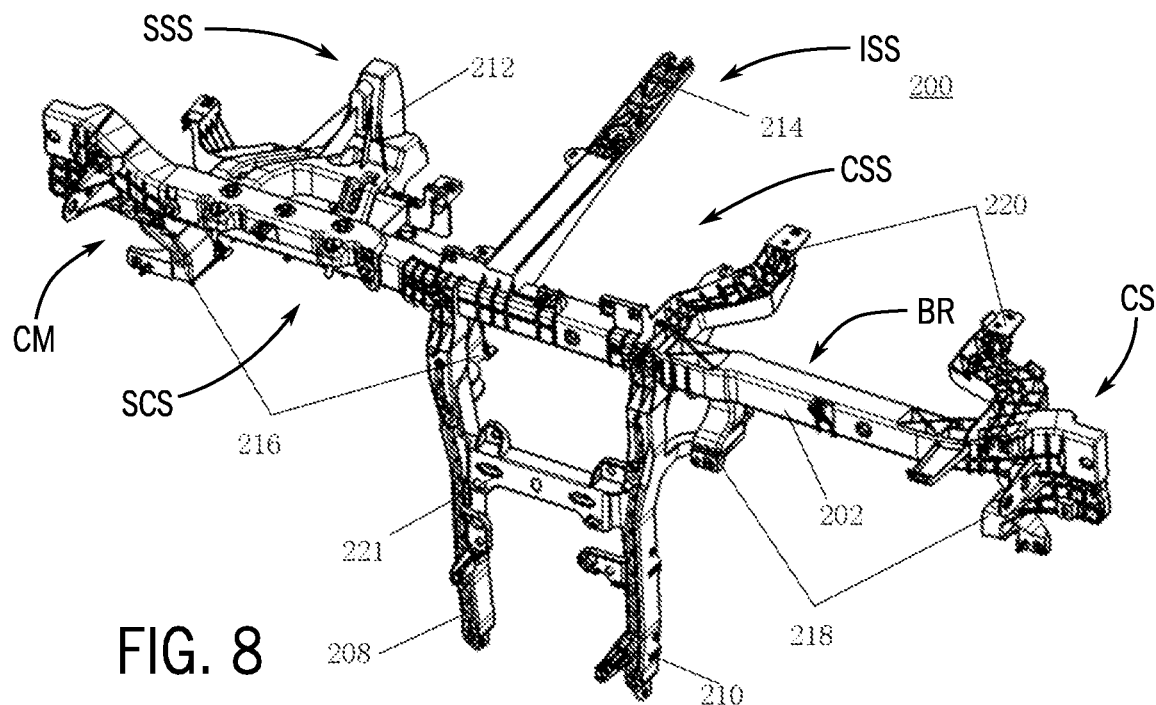
FIG. 8 is a schematic perspective view of a cross-member structure/assembly for an instrument panel according to an exemplary embodiment.
Figure 8A:
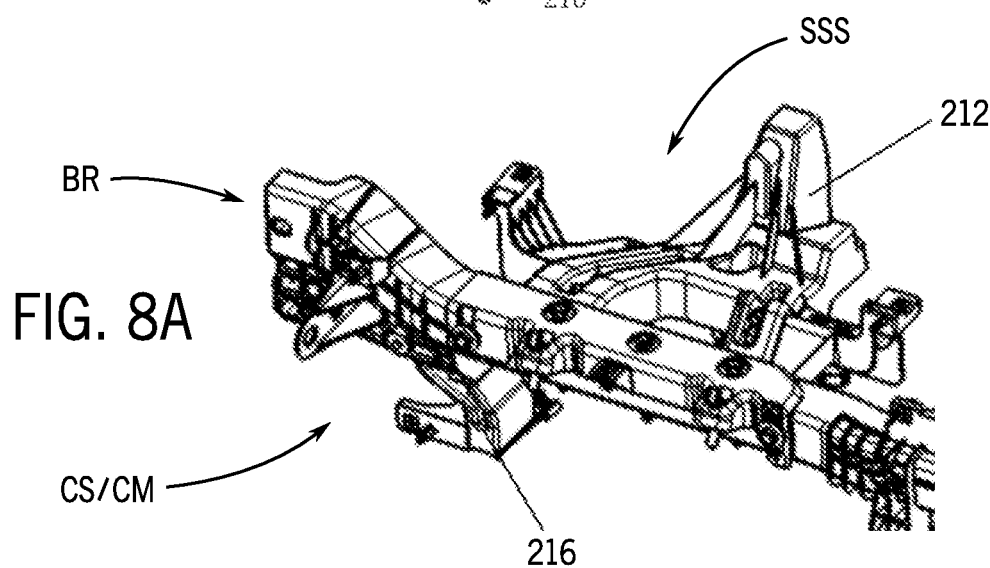
FIG. 8A is a schematic partial perspective view of a cross-member structure/assembly for an instrument panel of FIG. 8 according to an exemplary embodiment.
Figure 9:
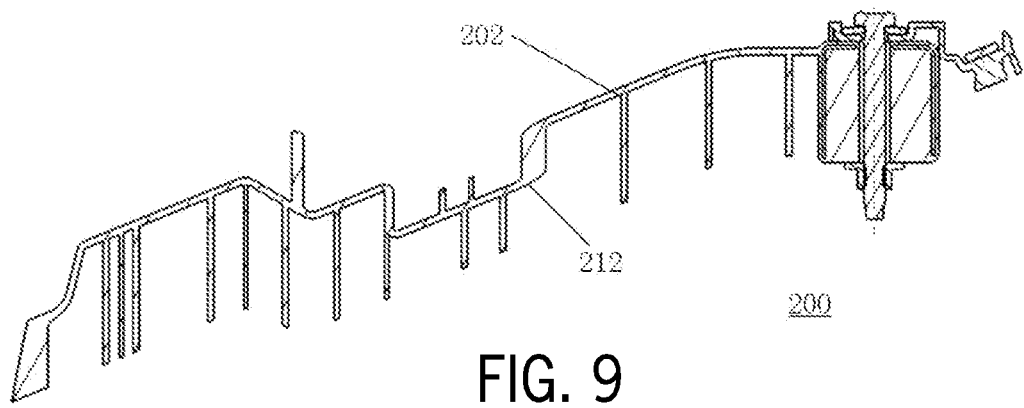
FIG. 9 is a schematic partial cross-section view of a cross-member structure/assembly for an instrument panel (taken along line C-C in FIG. 5) according to an exemplary embodiment.
Figure 10:
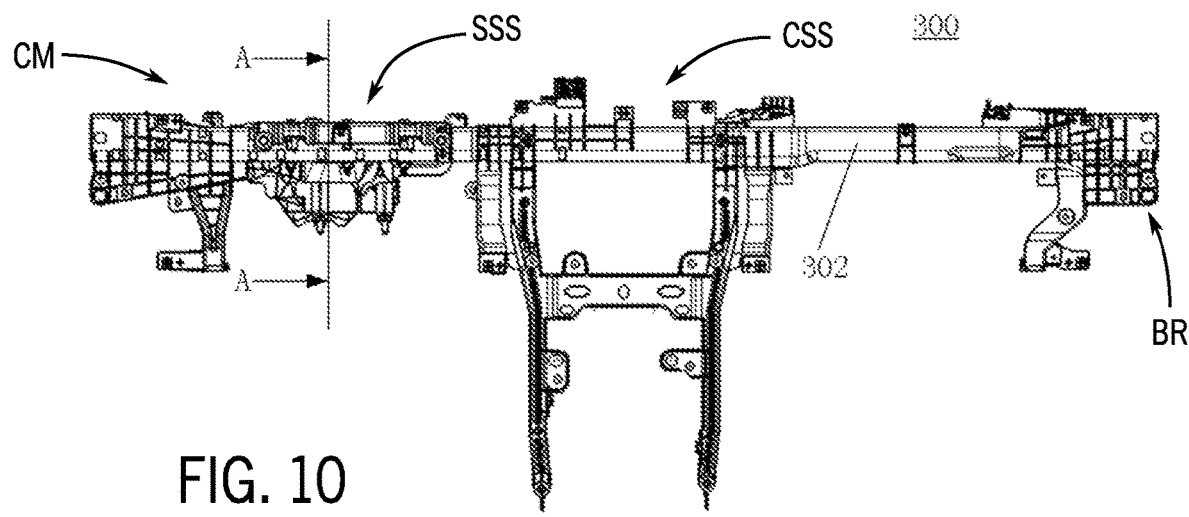
FIG. 10 is a schematic front view of a cross-member structure/assembly for an instrument panel according to an exemplary embodiment.
Figure 10A:
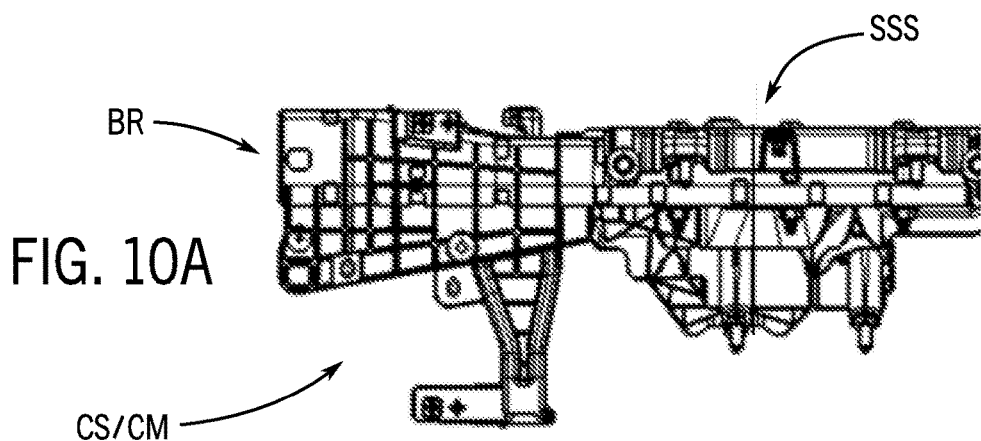
FIG. 10A is a schematic partial front view of a cross-member structure/assembly for an instrument panel of FIG. 10 according to an exemplary embodiment.
Figure 11:
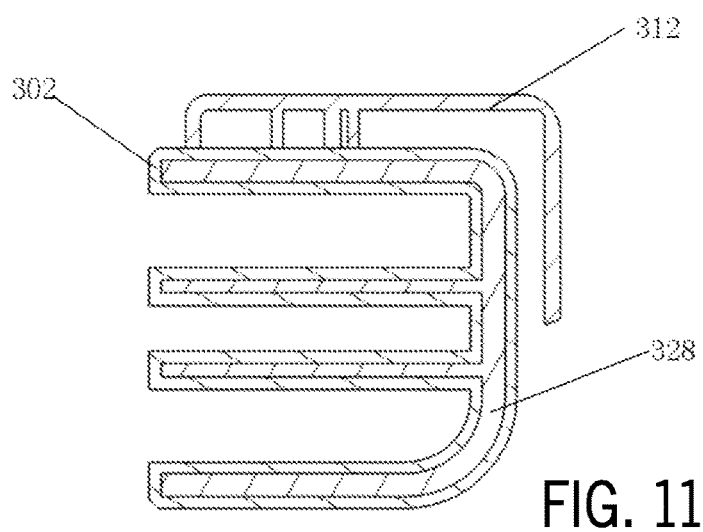
FIG. 11 is a schematic cross-section view of a cross-member structure/assembly for an instrument panel (taken along line A-A in FIG. 10) according to an exemplary embodiment.
Figure 12A:
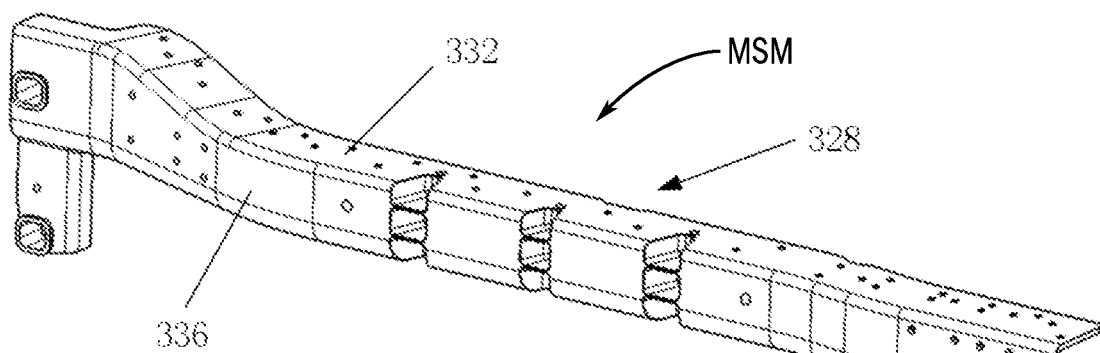
FIGS. 12A and 12B are a schematic perspective front and rear views of a member/structure of a cross-member structure/assembly for an instrument panel according to an exemplary embodiment.
Figure 12B:
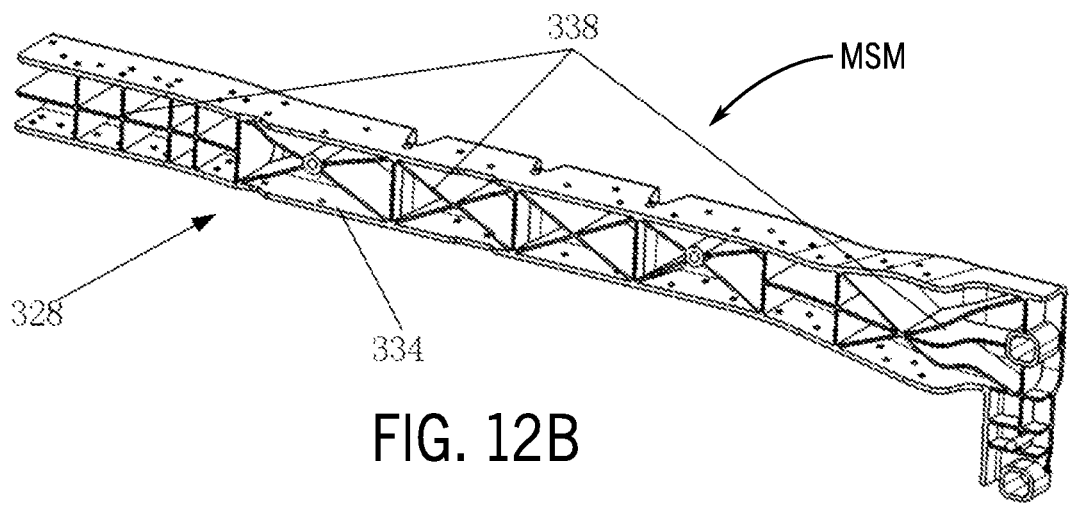
Figure 13A:
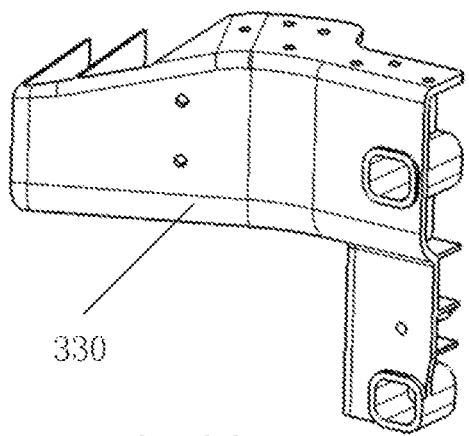
FIGS. 13A and 13B are a schematic partial front and rear perspective views of a member/structure of a cross-member structure/assembly for an instrument panel according to an exemplary embodiment.
Figure 13B:
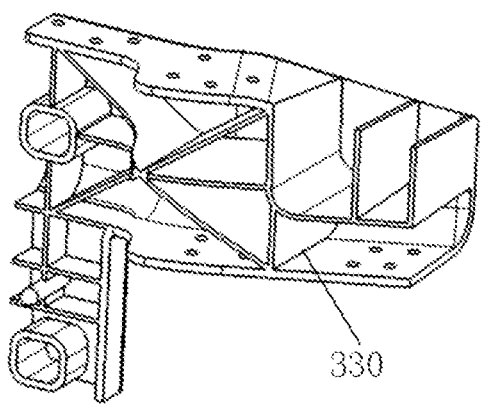

According to an exemplary embodiment as shown schematically in FIGS. 8-8A and 9, the instrument panel cross beam 200 may comprise bracket 208, bracket 210, bracket 212, bracket 214, bracket 216, bracket 218, bracket 220 and bracket 221 for mounting and/or connection may be made of plastic and may be integrally formed with the cross beam body 202 by an injection molding process.

As shown schematically in FIGS. 4, 5, 6 and 7A-7B, the instrument panel cross beam 100 may comprise a first structural member 128 and a second structural member 130 for reinforcement. As indicated in FIGS. 4, 5, 6 and 7A-7B, the first structural member 128 may be made of metal and may be provided within the cross beam body 102; the first structural member 128 may be located in a primary load-bearing area of the instrument panel cross beam 100; the first structural member 128 may extend from the first end 104 of the cross beam body 102 along the longitudinal direction of the cross beam body 102; the first structural member may have a first end 129 and a second end 131, the first end 129 of the first structural member 128 may be located at the first end 104 of the cross beam body 102, and the second end 131 of the first structural member 128 may be located between the first bracket 108 and the second bracket 110.

According to an exemplary embodiment shown schematically in FIGS. 4, 5, 6 and 7A-7B, the first structural member 128 may extend from the first end 104 of the cross beam body 102, so that the first end 104 of the cross beam body 102 may be connected with the left sidewall metal sheet of the vehicle through the first structural member 128 (e.g. to improve strength and durability of the connection between ends of the instrument panel cross beam and the left sidewall metal sheet of the vehicle and to increase dimensional/assembly tolerance of parts with improved ductility of metal to reduce the difficulty in manufacturing/assembly); the first structural member 128 may extend beyond the position of the first bracket 108 in the longitudinal direction of the cross beam body 102 to better ensure the load-bearing performance of the driver side section of the instrument panel cross beam 100 to which relatively heavy accessories such as a steering column and a steering wheel may be connected, reinforces the portion of the cross beam body 102 that may be connected with the front sidewall metal sheet and the floor metal sheet of the vehicle, and meets the modal requirements and the collision prevention performance of the instrument panel cross beam 100.

According to an exemplary embodiment, the second end 131 of the first structural member 128 may be located at a distance (e.g. in the range of 0 to 150 mm from the center) from the cross beam body 102 in the longitudinal direction (the second end 131 of the first structural member 128 may be located at the center of the cross beam body 102 in the longitudinal direction or on the left or right side of the center) to improve balance between the weight and mechanical performance of the instrument panel cross beam. According to an exemplary embodiment, the first structural member 128 may extend to a position of the fourth bracket 114 in the longitudinal direction of the cross beam body 102 to reinforce a portion where the cross beam body 102 may be connected with the front sidewall metal sheet of the vehicle. According to an exemplary embodiment, the first structural member 128 may be extended such as to carry a relatively heavy accessory (e.g. large-sized display screen to be mounted at the center section of the instrument panel cross beam 100). According to an exemplary embodiment, the first structural member 128 may extend beyond the center of the cross beam body 102 in the longitudinal direction by a distance that may be less than or equal to 150 mm.

Figure 7A:
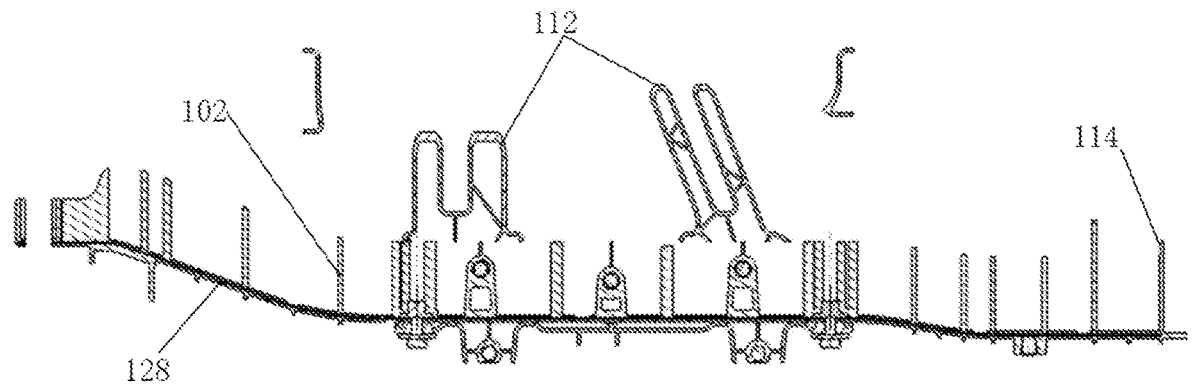
FIG. 7A is a schematic partial cross-section view of a cross-member structure/assembly for an instrument panel (taken at the left side along line B-B in FIG. 5) according to an exemplary embodiment.
Figure 7B:
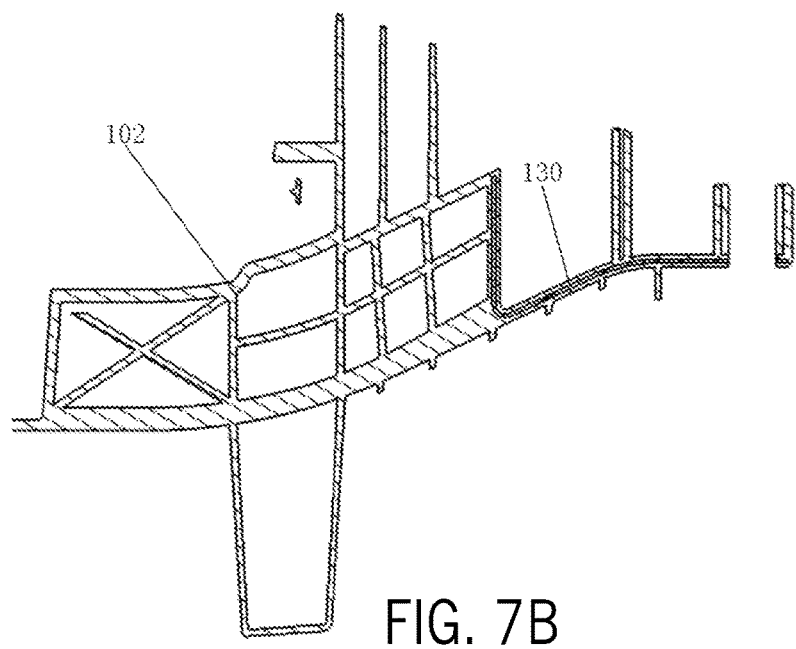
FIG. 7B is a schematic partial cross-section view of a cross-member structure/assembly for an instrument panel (taken at the right side along line B-B in FIG. 5) according to an exemplary embodiment.

According to an exemplary embodiment shown schematically in FIGS. 3, 4 and 7B, the second structural member 130 may be made of metal, and the second structural member 130 may be provided within the cross beam body 102 and extends from the second end 106 of the cross beam body 102 along the longitudinal direction of the cross beam body; the second structural member 130 extends from the second end 106 of the cross beam body 102, so that the second end 106 of the cross beam body 102 may be connected with the right sidewall metal sheet of the vehicle through the second structural member 130 (e.g. to improve the strength and durability of the connection between ends of the instrument panel cross beam 100 and the right sidewall metal sheet of the vehicle, and increases the dimensional/assembly tolerance of parts with improved ductility of metal, thus reducing the difficulty in manufacturing/assembly).

According to an exemplary embodiment shown schematically in FIGS. 4, 5, 6 and 7A-7B, the length of the second structural member 130 in the longitudinal direction of the cross beam body 102 may be defined as the length of the second structural member 130; the length of the second structural member 130 may be designed appropriately to cover the area of the instrument panel cross beam 100 (e.g. to be reinforced in the passenger side section at the second end 106 where the cross-member main body 102 may be connected with the right sidewall metal sheet of the vehicle, at the sixth bracket 118, and at the seventh bracket 120 to improve balance between the weight and mechanical performance of the instrument panel cross beam 100). According to an exemplary embodiment, the second structural member 130 may have a length of less than or equal to 250 mm.

According to an exemplary embodiment shown schematically in FIGS. 4, 8, 10 and 14, with design of positions and/or sizes of the first structural member and the second structural member, the strength and stiffness of the instrument panel cross beam may be increased, the connection between the instrument panel cross beam and the vehicle body may be enhanced, the modal requirement and the collision prevention performance of the instrument panel cross beam may be satisfied, the difficulty in manufacturing and assembly may be reduced, the instrument panel cross beam may be ensured to have relatively small weight and small size of the main cross beam.

Figure 6:
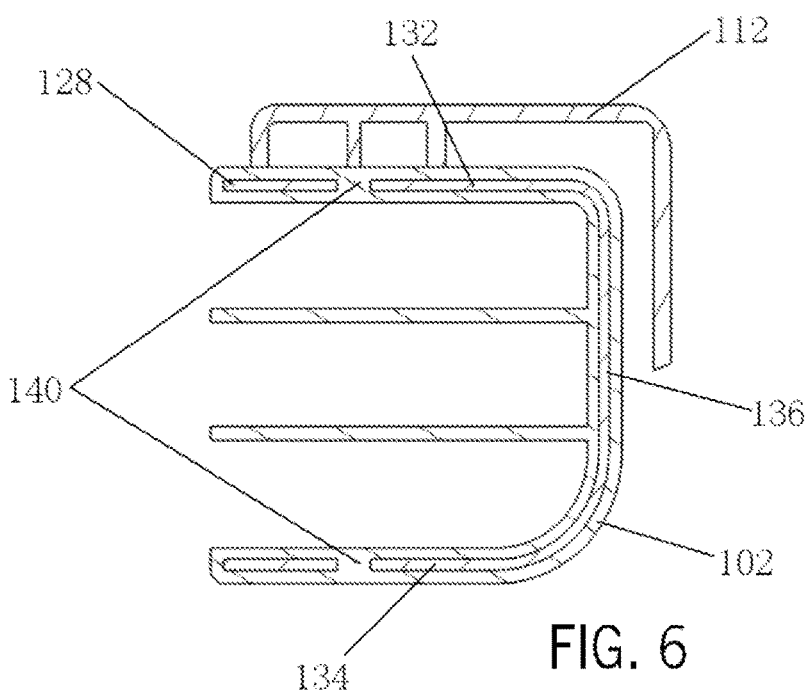
FIG. 6 is a schematic cross-section view of a cross-member structure/assembly for an instrument panel (taken along line A-A in FIG. 5) according to an exemplary embodiment.

According to an exemplary embodiment shown schematically in FIGS. 4-4A and 6, the first structural member 128 and the second structural member 130 may be steel structural members formed by stamping, and the first structural member 128 and the second structural member 130 may be similar in configuration. The first structural member 128 may have a top plate 132, a bottom plate 134, and a middle plate 136 provided between the top plate 132 and the bottom plate 134. The middle plate 136 may be connected with the ends of the top plate 132 and the bottom plate 134, and the top plate 132, the middle plate 136 and the bottom plate 134 have a U-shaped cross-section. The first structural member 128 may have a U-shaped structure.

According to an exemplary embodiment shown schematically in FIGS. 3-3A, 4-4A, and 5-5A, the first structural member 128 and the second structural member 130 may be integrally formed with the cross beam body 102 by an insert injection molding process. The first structural member 128 may be provided with a through hole 140. When the first structural member 128 may be integrally formed with the cross beam body 102 by an insert injection molding process, plastic may enter the through hole 140, thereby enhancing the bonding strength of the first structural member 128 to the cross beam body 102. According to an exemplary embodiment, an interface between the first structural member 128 and the cross beam body 102 may be coated with an adhesive agent to enhance the bonding strength of the first structural member 128 to the cross beam body 102. The first structural member and the second structural member may be made of aluminum alloy or magnesium alloy and formed by a suitable process (e.g. die casting or metal injection molding).

According to an exemplary embodiment shown schematically in FIGS. 10-10A, 11, 12A-12B and 13A-13B, an instrument panel cross beam 300 may comprise the first structural member 328 and the second structural member 330 of the instrument panel cross beam 300 made of aluminum alloy/magnesium alloy and have a reinforcing rib 338. According to an exemplary embodiment shown schematically in FIGS. 10-10A, 11, 12A-12B and 13A-13B, the first structural member 328 and the second structure 330 of the instrument panel cross beam 300 may be aluminum/magnesium alloy structures formed by metal injection molding; the first structural member 328 and the second structural member 330 may be similar in configuration; the first structural member 328 may have a top plate 332, a bottom plate 334, and a middle plate 336 provided between the top plate 332 and the bottom plate 334; the middle plate 336 may be connected with the ends of the top plate 332 and the bottom plate 334, and the top plate 332, the middle plate 336 and the bottom plate 334 have a U-shaped cross-section; the first structural member 328 may have a U-shaped structure; the first structural member 328 may further comprise a plurality of reinforcing ribs 338, the reinforcing ribs 338 may be provided in the space defined by the top plate 332, the bottom plate 334 and the middle plate 336 and connected with at least one of the top plate 332, the bottom plate 334 and the middle plate 336; the reinforcing ribs 338 may be arranged in different patterns (e.g. depending on reinforcement requirements, etc.).

Figure 14:
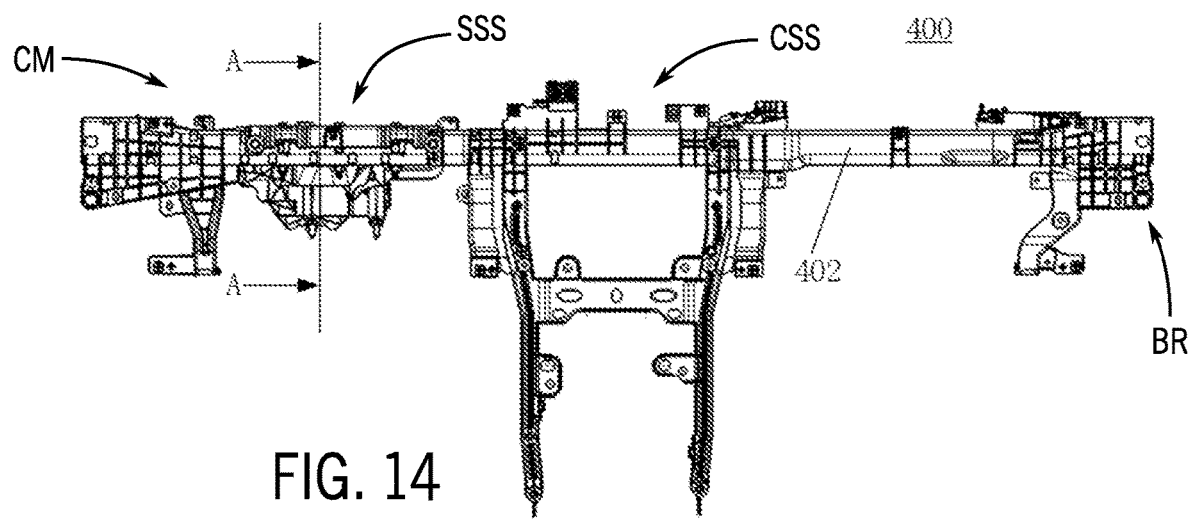
FIG. 14 is a schematic front view of a cross-member structure/assembly for an instrument panel according to an exemplary embodiment.
Figure 15:
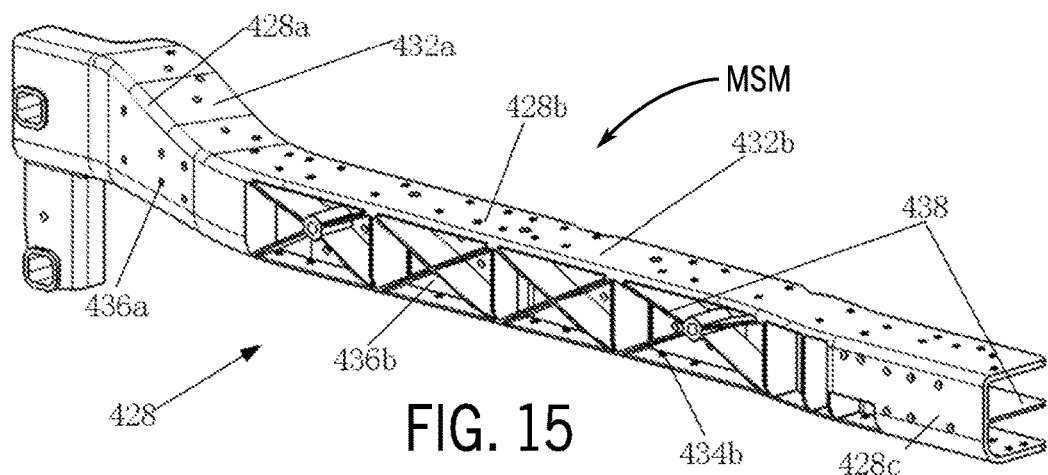
FIG. 15 is a schematic perspective view of a member/structure of a cross-member structure/assembly for an instrument panel according to an exemplary embodiment.
Figure 16:
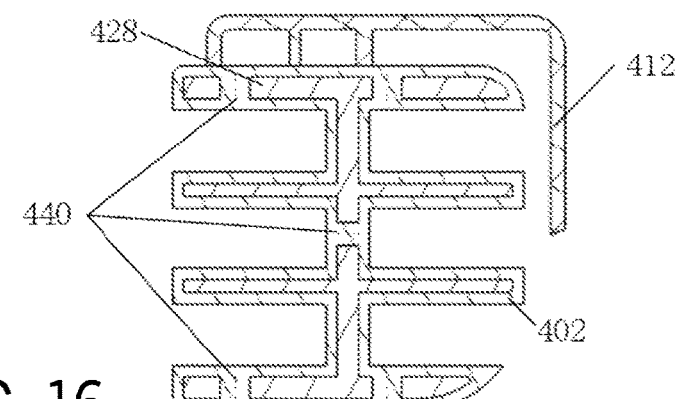
FIG. 16 is a schematic cross-section view of a cross-member structure/assembly for an instrument panel (taken along line A-A in FIG. 14) according to an exemplary embodiment.

As shown schematically according to an exemplary embodiment in FIGS. 14, 15 and 16, the instrument panel cross beam 400 the instrument panel cross beam 400 (e.g. similar to the instrument panel cross beam 300) may comprise a first structural member 428 with a U-shaped structure and an H-shaped structure.

According to an exemplary embodiment shown schematically in FIGS. 14, 15 and 16, the first structural member 428 may comprise a first section 428a, a second section 428b and a third section 428c; the first section 428a may have a top plate 432a, a bottom plate (not shown), and a middle plate 436a provided between the top plate 432a and the bottom plate; the middle plate 436a of the first section 428a may be connected with the ends of the top plate 432a and the bottom plate, and the top plate 432a, the middle plate 436a and the bottom plate of the first section 428a have a U-shaped cross-section; that is, the first section may have a U-shaped structure. Similarly, the third section 428c may have a U-shaped structure; the second section 428b may have a top plate 432b, a bottom plate 434b, and a middle plate 436b provided between the top plate 432b and the bottom plate 434b; the middle plate 436b of the second section 428b may be connected with the middle of the top plate 432b and the bottom plate 434b, and the top plate 432b, the middle plate 436b and the bottom plate 434b of the second section have an H-shaped cross-section; that is, the second section may have an H-shaped structure; the first structural member 428 may have a combination of a U-shaped structure and an H-shaped structure. According to an exemplary embodiment, the first structural member 428 may have an H-shaped structure only; the first structural member 428 may comprise a reinforcing rib 438.

According to an exemplary embodiment shown schematically in FIGS. 14, 15 and 16, the first structural member 428 may be provided with a through hole 440 and/or an interface of the first structural member 428 and the cross beam body 402 may be coated with an adhesive agent to enhance the bonding strength of the first structural member 428 to the cross beam body 402.

According to an exemplary embodiment, since the structural member of aluminum alloy/magnesium alloy may be partially provided in the instrument panel cross beam, it may be easier to manufacture the instrument panel cross beam than one entirely made of aluminum alloy/magnesium alloy. According to an exemplary embodiment shown schematically in FIGS. 3, 4, 5, 8, 10 and 14, the cross beam body of the instrument panel cross beam may be made of plastic, the cost of which may be often directly correlated with its mechanical performance. In order to ensure the overall mechanical performance of the instrument panel cross beam, high-mechanical-performance and high-cost plastic materials (such as PA6-GF/polypropylene glass fiber or PA66-GF/polypropylene glass fiber) may be often adopted in the prior art. According to an exemplary embodiment shown schematically in FIGS. 3, 4, 5, 8, 10 and 14, the instrument panel cross beam may be reinforced by the first structural member and the second structural member made of metal; the cross beam body may be made of a relatively low-cost plastic material (according to an exemplary embodiment, long glass fiber reinforced polypropylene PP-LGF/long glass fiber) to reduce the manufacturing cost while ensuring the mechanical performance of the instrument panel cross beam.

According to an exemplary embodiment indicated schematically in FIGS. 3, 4, 5, 8, 10 and 14, the instrument panel cross beam may feature improved mechanical performance, lower manufacturing cost, smaller size and lighter weight along with improved efficiency/ease of manufacture and/or assembly.

The cross-member structure may comprise a beam structure (e.g. generally horizontal cross-member) provided by a composite structure/assembly. The composite structure/assembly may comprise a plastic beam structure and a metal support structure. The cross-member structure may provide support for an instrument panel and/or to integrate with vehicle systems. The cross-member structure may provide a set of sections/segments such as an arrangement of beam/structure sections, mounting sections, and structural elements including members, webs, flanges, stiffeners, reinforcement, plates, walls, surfaces, etc.; the cross-member structure may provide structural reinforcement for the vehicle and may integrate vehicle systems/subsystems with the instrument panel. See generally FIGS. 2, 3-3A, 4-4A, 5-5A, 6, 7A-7B, 8-8A, 9, 10-10A, 11, 12A-12B, 13A-13B, 14, 15 and 16.

Exemplary Embodiments—C

According to an exemplary embodiment shown schematically in FIGS. 2, 3, 4 and 5, an instrument panel cross-member (100) for a vehicle may comprise a cross-member body (102) made of plastic and comprising a first end (104) and a second end (106), the first end (104) and the second end (106) being adapted to connect with left and right side wall sheet metal panels of the vehicle; a first structural member (128) made of metal and provided within the cross-member body (102); and a first bracket (108) and a second bracket (110) provided in the middle of the cross-member body (102) and adapted to support the central console of the vehicle, the first bracket (108) being closer to the first end (104) of the cross-member body (102) than the second bracket (110); the first structural member (128) may extend from the first end (104) of the cross-member body (102) along the longitudinal direction of the cross-member body (102) with first end (129) and a second end (131); the first end (129) of the first structural member (128) may be located at the first end (104) of the cross-member body (102) and the second end (131) of the first structural member (128) may be located between the first bracket (108) and the second bracket (110). The instrument panel cross-member (100) in intended to provide improved features for mechanical performance, manufacturing ease/cost reduction, reduced size and weight, etc. The instrument panel cross beam for a vehicle may comprise a cross beam body made of plastic and comprising a first end and a second end, the first end and the second end being adapted to connect with left and right sidewall metal sheets of the vehicle, respectively; a first structural member made of metal and provided within the cross beam body; and a first bracket and a second bracket provided in the middle of the cross beam body and adapted to support the central console of the vehicle, the first bracket being closer to the first end of the cross beam body than the second bracket and being adapted to connect with a floor metal sheet of the vehicle; wherein the first structural member extends from the first end of the cross beam body along the longitudinal direction of the cross beam body, and has a first end and a second end, the first end of the first structural member being located at the first end of the cross beam body, the second end of the first structural member being located between the first bracket and the second bracket. According to an exemplary embodiment, the second end of the first structural member may be located at a distance from a center of the cross beam body in the longitudinal direction, the distance being in a range of 0 to 150 mm. According to an exemplary embodiment, the instrument panel cross beam may comprise a second structural member, wherein the second structural member may be made of metal, may be provided within the cross beam body and extends from the second end of the cross beam body along a longitudinal direction of the cross beam body. According to an exemplary embodiment, the second structural member has a length of less than or equal to 250 mm. According to an exemplary embodiment, the first structural member and the second structural member may be integrally formed with the cross beam body by an insert injection molding process. According to an exemplary embodiment, the first structural member and/or the second structural member may be provided with a through-hole, and/or an interface between the first structural member and/or the second structural member and the cross beam body may be coated with an adhesive agent. According to an exemplary embodiment, the first structural member and/or the second structural member have a U-shaped structure, an H-shaped structure, or a combination. According to an exemplary embodiment, the first structural member and/or the second structural member may be provided with a reinforcing rib. According to an exemplary embodiment, the first structural member and/or the second structural member may be made of steel, aluminum alloy or magnesium alloy. According to an exemplary embodiment, the cross beam body may be made of glass fiber reinforced polypropylene. According to an exemplary embodiment, the instrument panel cross beam further comprises a third bracket adapted to mount a steering column and adapted to connect to a front sidewall metal sheet of a vehicle, wherein the third bracket may be made of metal and may be connected to the cross beam body, or the third bracket may be made of plastic and may be integrally formed with the cross beam body. According to an exemplary embodiment, an instrument panel cross beam for a vehicle may comprise a cross beam body made of plastic and may comprise a first end and a second end, the first end and the second end may be adapted to connect with left and right sidewall metal sheets of the vehicle. A first structural member made of metal may be provided within the cross beam body. A first bracket and a second bracket may be provided in the middle of the cross beam body and adapted to support the central console of the vehicle. The first bracket may be closer to the first end of the cross beam body than the second bracket and may be adapted to connect with a floor metal sheet of the vehicle. The first structural member may extend from the first end of the cross beam body along the longitudinal direction of the cross beam body and may have a first end and a second end, the first end of the first structural member may be located at the first end of the cross beam body, the second end of the first structural member may be located between the first bracket and the second bracket. The second end of the first structural member may be located at a distance from a center of the cross beam body in the longitudinal direction, the distance may be in a range of 0 to 150 mm. The instrument panel cross beam may comprise a second structural member; the second structural member may be made of metal, may be provided within the cross beam body and may extend from the second end of the cross beam body a longitudinal direction of the cross beam body. The second structural member may have a length of less than or equal to 250 mm. The first structural member and the second structural member may be integrally formed with the cross beam body by an insert injection molding process; the first structural member and/or the second structural member may be provided with a through-hole. An interface between the first structural member and/or the second structural member and the cross beam body may be coated with an adhesive agent; the first structural member and/or the second structural member may have a U-shaped structure, an H-shaped structure, or a combination; the first structural member and/or the second structural member may be provided with a reinforcing rib; the structural member and/or the second structural member may be made of steel, aluminum alloy or magnesium alloy; the cross beam body may be made of long glass fiber reinforced polypropylene; the instrument panel cross beam may comprise a third bracket adapted to mounting a steering column and adapted to connect to a front sidewall metal sheet of a vehicle; the third bracket may be made of metal and may be connected to the cross beam body; the third bracket may be made of plastic and may be integrally formed with the cross beam body.

According to an exemplary embodiment, the instrument panel cross beam may comprise a plastic cross beam body and a metal structural member provided in the plastic cross beam body may combine the advantages of lightness of plastic with high strength and small size of metal; improved balance among the size, weight and mechanical performance of the instrument panel cross beam may be achieved by properly designing the positions and/or sizes of the first structural member and the second structural member, such as providing the metal structural member in a primary load-bearing area and the portion where the cross beam body may be connected to the vehicle body, thus increasing dimensional tolerance and assembly tolerance of the parts, and reducing the difficulty in assembly and manufacturing the instrument panel cross beam; the cross beam body may be made of plastic materials with lower cost because the instrument panel cross beam may be reinforced with the metal structural member, and besides, the integral mechanical performance of the instrument panel cross beam may be ensured.

Exemplary Embodiments—D

According to an exemplary embodiment as shown schematically in FIGS. 1A-1B and 2, an instrument panel for a vehicle may be generally integrated with vehicle systems as to provide electronic control display components such as a combination meter, a navigation multimedia display and an air conditioning control panel, functional components such as a glove box, a storage box and an air outlet, and various trim components such as a trim skin and a decorative panel. According to an exemplary embodiment, the instrument panel may be configured to integrate and support components for vehicle systems such as for integrating control, storage, trim structures, decorative features and other functions.

According to an exemplary embodiment, an instrument panel assembly will typically require suitable strength and stiffness. A conventional instrument panel assembly may be supported internally by a steel cross beam that comprises a steel cross beam body and a plurality of brackets welded or bolted to the cross beam body for installing various instrument panel assembly parts. For purposes/consideration of energy conservation and sustainability/emission reduction of vehicles, it may be beneficial improve a cross-member structure for an instrument panel to reduce weight/mass. An instrument panel cross beam made of aluminum alloy, magnesium alloy, high-strength plastic materials or the like has been developed, such as indicated for example in Chinese Patent Application Publication No. CN 103930339A and Chinese Patent Application Publication No. CN 106945729A (e.g. instrument panel cross beam made of fiber reinforced plastics and aluminum alloys). The use of high-strength plastic in a cross beam structure may require large size/space and produce greater expense; differences in performance between plastic and metal must be addressed; use of metals such as aluminum/magnesium alloy for cross beam structure may be complicated and expensive to produce. Combining plastic parts and metal parts such has been indicated, for example in. Chinese Patent Application Publication No. CN 108639160A (e.g. cross beam framework structure comprising a cross beam made of metal and a framework made of plastic).

It would be advantageous to provide according to an exemplary embodiment as indicated in the FIGURES, an improved cross-member structure/assembly for an instrument panel and vehicle systems such as with an improved composite structure with a plastic base structure and a metal structural support section, providing an improve balance of performance, strength, mass/weight, space/size, cost of materials, cost/efficiency of production/manufacture and assembly. According to an exemplary embodiment, the composite structure for the cross-beam structure/assembly may comprise a plastic framework and a metal structure, such as formed by assembly and/or by insert/injection molding. The cross-beam structure may be configured for mounting/support of components/systems at or on the instrument panel system, providing a framework, structural support, mounting access, etc. in a manner to achieve improved balance among performance, weight, space, cost, manufacturing, etc.

REFERENCE SYMBOL LIST

| REFERENCE SYMBOL | ELEMENT, PART OR COMPONENT |
|---|---|
| V | Vehicle |
| I | interior |
| IP | Instrument panel |
| CM | instrument panel cross-member assembly |
| CMA | cross-member assembly |
| CS | composite structure |
| BR | beam structure |
| SCS | steering column structure section |
| CSS | intermediate structure section |
| E | mounting structure/end section |
| SSS | structural support section |
| MSM | metal structural member |
| MBM | metal bracket member |
| ISS | intermediate structural support section |
| ST | steering wheel |
| IC | instrumentation |
| ES | infotainment/entertainment system |
| DP | display panel |
| AS | airbag deployment system |
| HVAC | heating, ventilation, and air conditioning system outlet |
| 100 | instrument panel cross member |
| 102 | cross member body |
| 104 | first end |
| 106 | second end |
| 108 | first bracket |
| 110 | second bracket |
| 112 | third bracket |
| 114 | fourth bracket |
| 116 | fifth bracket |
| 118 | sixth bracket |
| 120 | seventh bracket |
| 121 | eighth bracket |
| 122 | sleeves |
| 124 | nuts |
| 126 | bolts |
| 128 | first structural member |
| 129 | first end |
| 130 | second structural member |
| 131 | second end |
| 132 | top plate |
| 134 | bottom plate |
| 136 | middle plate |
| 140 | through hole |
| 200 | instrument panel cross member |
| 202 | cross member body |
| 208 | bracket |
| 210 | bracket |
| 212 | bracket |
| 214 | bracket |
| 216 | bracket |
| 218 | bracket |
| 220 | bracket |
| 221 | bracket |
| 300 | instrument panel cross member |
| 302 | cross member body |
| 328 | first structural member |
| 330 | second structural member |
| 332 | top plate |
| 334 | bottom plate |
| 336 | middle plate |
| 338 | reinforcing ribs |
| 400 | instrument panel cross member |
| 402 | cross member body |
| 428 | first structural member |
| 428a | first section |
| 428b | second section |
| 428c | third section |

-continued

REFERENCE SYMBOL LIST

| REFERENCE SYMBOL | ELEMENT, PART OR COMPONENT |
|---|---|
| 432a | top plate |
| 432b | bottom plate |
| 434b | middle plate |
| 436a | middle plate |
| 436b | middle plate |
| 438 | reinforcing rib |
| 440 | through hole |
| 432a | top plate |
| 432b | bottom plate |
| 434b | middle plate |
| 436a | middle plate |
| 436b | middle plate |
| 438 | reinforcing rib |
| 440 | through hole |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A cross-member assembly (CM) configured for installation in a vehicle providing vehicle systems including an instrument panel (IP) comprising:
 a composite structure (CS) comprising
 (a) a beam structure (BR) comprising a plastic beam structure;
 (b) a structural support section (SSS) comprising a metal structural member (MSM); and
 (c) a set of mounting structures (E) at each end of the beam structure (BR) configured to mount the composite structure (CS) to the vehicle;
 wherein the structural support section (SSS) is configured to reinforce the beam structure (BR) of the composite structure (CS);
 wherein the metal structural member (MSM) of the structural support section (SSS) is formed with the plastic beam structure of the beam structure (BR) of the composite structure (CS);
 wherein the plastic beam structure comprises a segment comprising a set of structural elements within the segment comprising at least one of a plate or a panel or a web or a stiffener;
 wherein the metal structural member (MSM) comprises a structural section comprising a reinforcement comprising at least one of a plate or a panel or a web or a rib;
 wherein the metal structural support section (SSS) is assembled with the plastic beam structure of the composite structure (CS).

2. The assembly of claim 1 wherein the reinforcement of the metal structural member (MSM) is configured to reinforce the beam structure (BR) of the composite structure (CS).

3. The assembly of claim 1 wherein the reinforcement of the metal structural member (MSM) and a metal bracket member (MBM) are configured to reinforce the beam structure (BR) of the composite structure (CS).

4. The assembly of claim 1 wherein the beam structure (BR) comprises at least one of (a) an integrally-formed plastic structure or (b) an injection-molded plastic structure or (c) an injection molded plastic structure with insert or (d) an over-molded plastic structure with insert.

5. The assembly of claim 1 wherein the composite structure (CS) provides a steering column structure section (SCS) and an intermediate structure section (CSS); wherein the structural support section (SSS) with the metal structural member (MSM) is configured to reinforce the beam structure (BR) of the composite structure (CS) at the steering column structure section (SCS).

6. The assembly of claim 1 wherein the composite structure (CS) provides a plastic steering column structure section (SCS) and a plastic intermediate structure section (CSS); wherein the metal structural member (MSM) is overmolded in the composite structure (CS) with the plastic steering column structure section (SCS) and the plastic intermediate structure section (CSS).

7. The assembly of claim 1 further comprising an intermediate structural support section (ISS) configured to support the intermediate structure section (CSS) of the beam structure (BR) of the composite structure (CS).

8. The assembly of claim 1 wherein the metal structural member (MSM) comprises a beam structure configured to provide reinforcement for installation of a display panel (DP) on the composite structure (CS) for the instrument panel (IP).

9. The assembly of claim 1 wherein the metal structural member (MSM) comprises a metal material; wherein the metal material comprises at least one of (a) steel; (b) an aluminum alloy; (c) a magnesium alloy; (d) a die-cast material; (e) an injection-molded metal.

10. An instrument panel cross-member assembly for a vehicle providing a floor panel comprising:
 a plastic cross-member body comprising a first end and a second end;
 a metal structure configured to reinforce the plastic cross-member body;
 a first bracket adjacent the first end of the plastic cross-member body;
 a second bracket configured to connect with the floor panel of the vehicle;
 wherein the metal structure comprises a first structural member and a second structural member;
 wherein the plastic cross-member body comprises a section configured to extend along a longitudinal direction between the first bracket and the second bracket;
 wherein the plastic cross-member body comprises a segment within the section comprising a set of stiffeners comprising a set of panels within the segment;
 wherein the metal structure comprises a structural section comprising a set of reinforcements comprising a set of panels within the structural section.

11. The assembly of claim 10 wherein the metal structure is configured to support a central console of the vehicle.

12. The assembly of claim 10 wherein the first structural member comprises a metal bracket; wherein the second structural member comprises a metal bracket.

13. The assembly of claim 10 wherein the first structural member and the second structural member are integrally formed with the plastic cross-member body.

14. The assembly of claim 10 wherein the first structural member and/or the second structural member comprise (a) a U-shaped structure and/or (b) an H-shaped structure.

15. The assembly of claim 10 wherein the first structural member and/or the second structural member comprise a reinforcing rib.

16. The assembly of claim 10 wherein the plastic cross-member body comprises at least one of (a) a plastic material or (b) a resin material or (c) a glass fiber reinforced polypropylene or (d) a carbon fiber material or (e) a composite material; wherein the set of stiffeners comprising the set of panels within the segment of the plastic cross-member body comprises at least one of a set of webs or a set of plates or a set of flanges.

17. The assembly of claim 10 further comprising a third structural member configured to mount a steering column and to connect to the floor panel of the vehicle; wherein the third structural member comprises at least one of (a) a metal structure connected to the plastic crossmember body and/or (b) a plastic section integrally-formed with the plastic cross-member body.

18. A cross-member assembly (CM) configured for installation in a vehicle providing vehicle systems including an instrument panel (IP) comprising:
 a composite structure (CS) comprising (a) a beam structure (BR) comprising a plastic beam structure;
(b) a structural support section (SSS) comprising a metal structural member (MSM); and
(c) a set of mounting structures (E) at each end of the beam structure (BR) configured to mount the composite structure (CS) to the vehicle;
wherein the structural support section (SSS) is configured to reinforce the beam structure (BR) of the composite structure (CS);
wherein the metal structural member (MSM) of the structural support section (SSS) is formed with the plastic beam structure of the beam structure (BR) of the composite structure (CS);
wherein the plastic beam structure comprises a segment comprising a set of structural elements within the segment comprising at least one of a plate or a panel or a web or a stiffener;
wherein the metal structural member (MSM) comprises a structural section comprising a reinforcement comprising at least one of a plate or a panel or a web or a rib;
wherein the composite structure (CS) comprises a composite beam structure;
wherein the segment within the plastic beam structure comprises a set of segments comprising a set of plates comprising stiffeners;
wherein the section of the metal structural member (MSM) comprises a set of sections comprising a set of plates comprising reinforcements.

19. A cross-member assembly (CM) configured for installation in a vehicle providing vehicle systems including an instrument panel (IP) comprising:
a composite structure (CS) comprising
(a) a beam structure (BR) comprising a plastic beam structure;
(b) a structural support section (SSS) comprising a metal structural member (MSM); and
(c) a set of mounting structures (E) at each end of the beam structure (BR) configured to mount the composite structure (CS) to the vehicle;
wherein the structural support section (SSS) is configured to reinforce the beam structure (BR) of the composite structure (CS);
wherein the metal structural member (MSM) of the structural support section (SSS) is formed with the plastic beam structure of the beam structure (BR) of the composite structure (CS);
wherein the plastic beam structure comprises a segment comprising a set of structural elements within the segment comprising at least one of a plate or a panel or a web or a stiffener;
wherein the metal structural member (MSM) comprises a structural section comprising a reinforcement comprising at least one of a plate or a panel or a web or a rib;
wherein the structural support section (SSS) comprises an assembly; wherein the set of structural elements within the plastic beam structure comprises a set of webs within a set of walls;
wherein the reinforcement of the metal structural member (MSM) comprises a set of plates.

20. The assembly of claim 19 wherein the beam structure (BR) comprises at least one of (a) an integrally-formed plastic structure or (b) an injection-molded plastic structure or (c) an injection molded plastic structure with insert or (d) an over-molded plastic structure with insert.

* * * * *